United States Patent [19]
Andrieu et al.

[11] Patent Number: 5,300,337
[45] Date of Patent: Apr. 5, 1994

[54] WRAPAROUND CLOSURE DEVICE

[75] Inventors: Hubert Andrieu; Daniel G. Caudron, both of Crepy-en-Valois, France; Harry F. Gladfelter, Phoenixville; Marie C. Tresslar, Jeffersonville, both of Pa.; Denis H. T. Van Wassenhove, Crepy-en-Valois, France; Michael A. Ford, West Chester, Pa.

[73] Assignee: The Bentley-Harris Manufacturing Company, Lionville, Pa.

[21] Appl. No.: 923,866

[22] Filed: Aug. 3, 1992

Related U.S. Application Data

[63] Continuation-in-part of Ser. No. 819,088, Jan. 9, 1992, Pat. No. 5,178,923.

[51] Int. Cl.$^5$ .............................................. B32B 23/02
[52] U.S. Cl. .................................. 428/36.1; 428/36.3; 428/100; 428/192; 428/193; 428/253; 428/257; 428/258
[58] Field of Search ................. 428/36.1, 36.3, 100, 428/192, 193, 253, 257, 258

[56] References Cited

U.S. PATENT DOCUMENTS

| | | | |
|---|---|---|---|
| 3,413,406 | 11/1968 | Plummer | 174/3 |
| 4,281,211 | 7/1981 | Tatum et al. | 174/36 |
| 4,371,578 | 1/1983 | Thompson | 428/192 |
| 4,684,762 | 8/1987 | Gladfelter | 174/36 |
| 4,784,886 | 11/1988 | Monget et al. | 428/36.1 |
| 4,791,236 | 12/1988 | Klein et al. | 174/36 |
| 4,891,256 | 1/1990 | Kite, III et al. | 428/36.1 |
| 5,178,923 | 1/1993 | Andrieu et al. | 428/36.1 |

FOREIGN PATENT DOCUMENTS 2506147  8/1976  Fed. Rep. of Germany.

*Primary Examiner*—James J. Bell
*Attorney, Agent, or Firm*—Synnestvedt & Lechner

[57] ABSTRACT

Wraparound sleeves formed by weaving, knitting or braiding for the protection of elongated articles, such as cables and hoses, are disclosed. The tubes are provided with closure means comprising multifilament, bulky yarn interlaced in the sleeving material and relatively unconfined along one of its marginal edges and of Velcro brand hook tape or similar hook type elements disposed along the other marginal edge.

10 Claims, 2 Drawing Sheets

WRAPAROUND CLOSURE DEVICE

RELATED APPLICATION

This application is a continuation in part of application Ser. No. 07/819,088 filed Jan. 9, 1992, now U.S. Pat. No. 5,178,923.

FIELD OF THE INVENTION

This invention relates to wraparound fabric sleeves of interlaced fibrous materials, the sleeves being preferably formed by a weaving process. More particularly, the invention relates to wraparound sleeves having a closure device and even more specifically to wraparound sleeves for the protection of elongated articles, such as cables wherein the sleeves are intended to provide protection from the effects of abrasion or heat as well as to maintain the elongated articles in a neatly bundled arrangement so that they are not damaged by moving machinery parts or the like.

BACKGROUND OF THE INVENTION

The use of flexible sleeves for the protection of cables, hoses and other elongated articles for the purposes above noted is well known. In addition, it is well known to secure the marginal edges of the sleeving material together by means of zipper type fastener elements. A product for this purpose is a sleeve formed of braided monofilament secured together by a zipper type fastener element. Such sleeving is sold by The Bentley-Harris Manufacturing Company under the trademark EXPANDO ZIP and is widely used in automotive as well as other applications, for example, for bundling cables and hoses and the like in an automobile or truck engine compartment. Other types of sleeving available from The Bentley-Harris Manufacturing Company are woven, knitted or braided from materials such as monofilaments of engineered plastic materials, glass fiber, wire and bulky yarns and combinations thereof, depending upon the requirements of the particular application. In addition, other means of fastening sleeves of the type disclosed are known in the art. In addition to the use of zipper type fasteners, these include tongue and groove type elongated flexible plastic fasteners, VELCRO hook and loop brand type tapes exposed along the marginal edges of the sleeving material, tape wraps and wire or tape ties. Despite the availability of the foregoing, the need exists for a simple and reliable, relatively low cost system, for closure of a sleeve which will accommodate variations in the diameter of a bundle of elongated articles, such as cables having connectors intermediate their length, while allowing for cable breakouts at points where a cable is required to be connected to a particular instrument or item of equipment.

SUMMARY AND OBJECTS OF THE INVENTION

In accordance with the invention, a ribbon or web of sleeving material is provided, the sleeving material being comprised of monofilament warps and bulky multi-filament yarn as the fill material. According to the invention, the bulky multi-filament yarn is exposed and relatively unconfined on both the inner and the outer surface in a band extending along one marginal edge of the fabric by decreasing the density of the warp monofilaments, and a multiplicity of hook type fastener elements extend along the opposite marginal edge of the web. The hook type fastener elements penetrate and interengage with the fibers of the bulky yarn for closure of the sleeve around the elongated articles. Advantageously, the hook type fasteners are provided as a tape of the kind sold under the trademark VELCRO. The tape is typically sewn or adhesively bonded to the web along the edge thereof with the hook elements facing generally outwardly from the surface of the tape and thus from the surface of the fabric into which the tape is secure.

In a preferred form of the invention, although the materials may be added to the product, the sleeving is woven of warp monofilaments and bulky multi-filament yarn in the fill direction interwoven with relatively large multi-filament yarn loops exposed and relatively unconfined along at least one marginal edge of the sleeve. More preferably, the monofilament warps in the region of the marginal edge are spaced relatively far apart to maximize exposure and to all for separative of the filaments of the bulky fill yarns. By orienting the bulky yarn so that the individual yarn filaments extend horizontally, it has been found that the hooks more readily penetrate the yarn and hook under groups or subgroups of the horizontally extending filamentary material of which the yarn is comprised. By use of the arrangement, highly effective and efficient adherence of the hooks of the hook type fastener tape to the yarns within the band is achieved.

In accordance with the foregoing, important objectives of the present invention include the following:

the provision of a wraparound sleeve with fastening means comprised of hook tape disposed to interengage with filaments or groups of filaments of interwoven bulky multifilament fill yarn exposed along a marginal edge of the sleeve material;

the provision of fastening means for a wraparound sleeve which eliminates the need for taping or tieing;

the provision of a fastening means for a wraparound sleeve which readily accommodates breakout with substantially no tendency of the jointed sleeve edges to separate; and the provision of a fastening means for a wraparound sleeve which eliminates the need for a special tool for fastening the sleeve edges together.

A still further objective of the invention is the provision of a wraparound sleeve having fastening means which accommodates considerable variation in the overall size of the elongated article or articles being protected.

The foregoing as well as other objectives and advantages of the invention will become apparent from the following detailed description of the illustrative embodiment of the invention.

DETAILED DESCRIPTION OF THE DRAWINGS

DETAILED DESCRIPTION OF THE PREFERRED EMBODIMENT OF THE INVENTION

Figure 1:
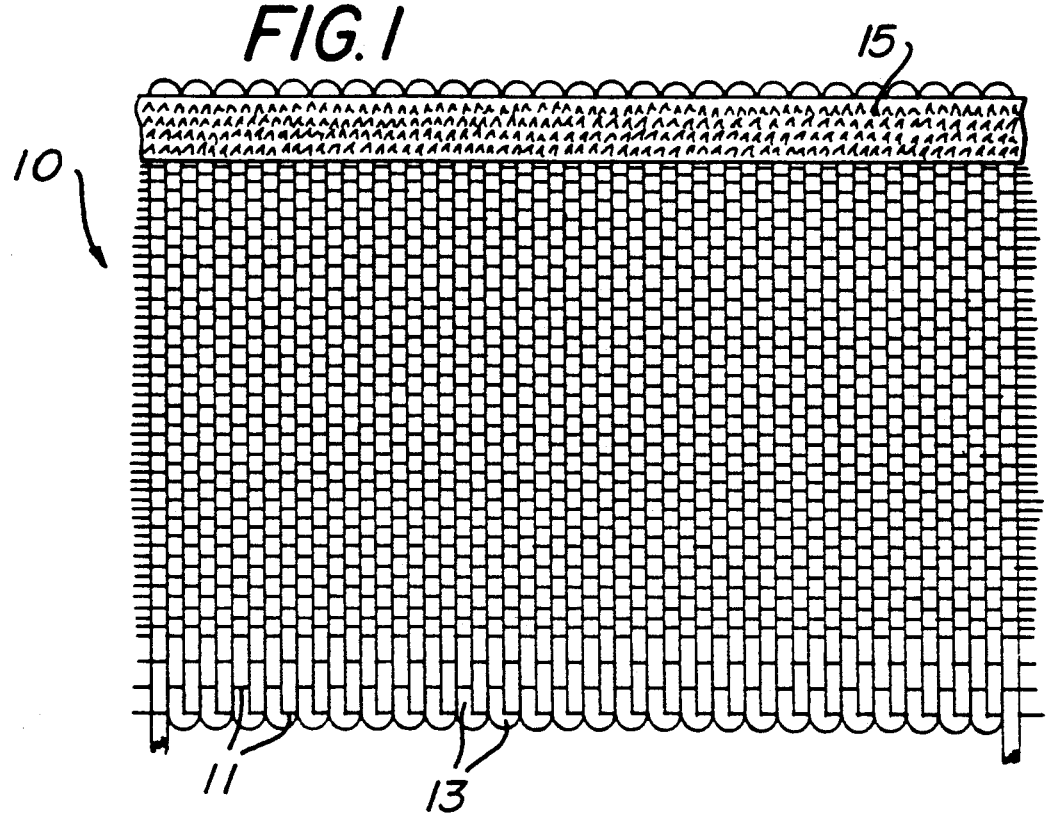
FIG. 1 is a view showing a wraparound sleeve material having bands of interengageable fastener elements disposed in accordance with the present invention.
Figure 2:
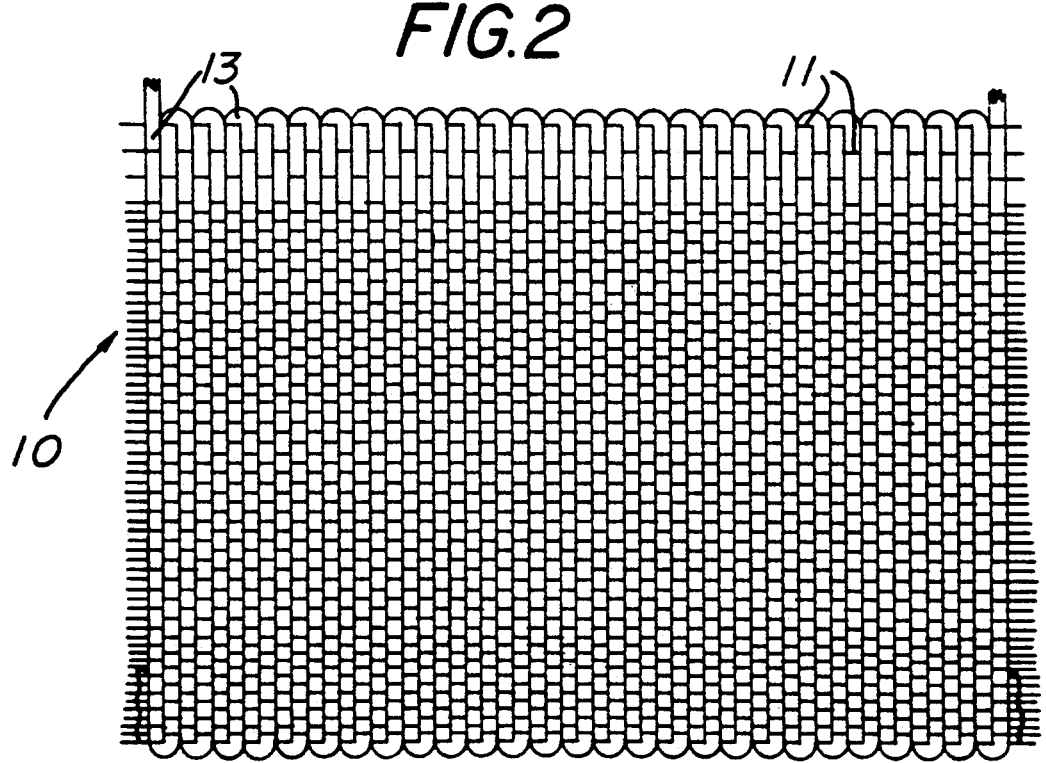
FIG. 2 is a view of the reverse side of the wraparound sleeve material of FIG. 1.

Referring first to FIGS. 1 and 2, there is illustrated woven fabric sleeve material of the kind incorporating the features of the present invention.

As best illustrated in FIGS. 1 and 2, the sleeve material is comprised of monofilament warps 10 which are formed of polyester or other suitable material which are preferably of the family of materials commonly referred to as engineered plastics.

Materials in the family of engineered plastics of the type referred to herein include plastics that have a tensile modulus of greater than 50,000 psi and in the from about 50,000 to about 200,000. Examples of engineered plastics are the olefin polymers of which are poly 4-methyl pentene and fluorinated polyolefins, ethylenetetrafluoroethylene copolymers and vinylidene fluoride polymers, especially polyvinylidene fluoride and blends thereof, for example, the fluorinated olefin blends as described and claimed in British Patent No. 1,120,131, polyesters, for example, polyethylene terephthalate, polytetramethylene terephathalate for example that are treated as described in U.S. Pat. Nos. 3,968,015, 4,073,830 and 4,113,594, polyphenyleneoxide and -sulphide, blends of polyethylene oxide with styrene, silicone carbonate block copolymers, polyketones, such as polyarylether ketones, for example, those described and claimed in U.S. Pat. Nos. 3,953,400, 4,024,314, 4,229,564, 3,751,398, 3,914,298, 3,956,146 and 4,111,908 and in British Patent Nos. 1,387,303 and 1,383,393, polysulphones, for example, polyaryl sulphones, polyarylethere sulphones, polyetherimides, for example those described in U.S. Pat. No. 3,847,867, polycarbonates, especially those derived from bis phenol-A, polyamides, especially those described and claimed in U.S. Pat. Nos. 3,551,200 and 3,677,921 and in British Patent No. 1,287,932, poly ether ether ketone (peek), epoxy resins and blends of one or more of the above-mentioned polymeric materials either with each other or with other polymeric materials. A more detailed discussion of the above materials is found in British Specification No. 1,529,351 which is incorporated herein by reference. It is especially preferred to use polyester as the monofilament material as polyester is relatively inexpensive and sufficiently impervious to the changes in temperature found for most automotive applications.

For typical sleeves utilized for bundling wires or tubing in automotive applications the monofilaments range in diameter from about 8 to about 15 mils.

According to the invention, it is contemplated that the sleeves are made from fabric in ribbon or web form by shuttle loom, needle loom, scrim, fused lattice or braiding techniques. In addition, the objectives of the invention may be accomplished by knitting, braiding or weaving articles in tubular form and thereafter cutting the tube longitudinally so as to form a web of material used for manufacturing a sleeve.

Interlaced with the warp monofilament, as best illustrated in FIG. 1, are strands of relatively bulky multi-filament yarn 11 extending in the fill direction. The multi-filament yarn may take various forms and be comprised of a variety of materials. The use of yarns having a denier of about 600–2500 and having about 70–450 filaments is considered to be within the scope of the invention. As illustrated, multi-filament yarn comprised of 192 individual filaments and having a denier of 1300 has been employed and has been found to produce extremely effective results. As is seen in FIGS. 1 and 2 and also in the schematic view of FIG. 3, the sleeve material of the present invention is of relatively closed construction, there being about 40 monofilaments per inch, although the density of the monofilaments may be varied to provide a denser or a more open construction in accordance with various product applications without departing from the teachings of the invention.

Figure 3:
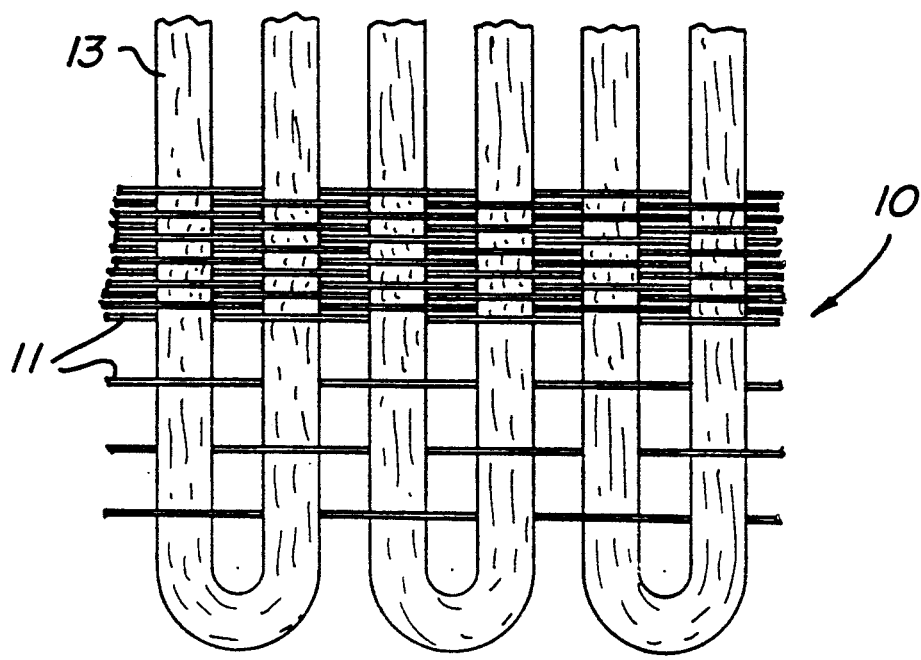
FIG. 3 is a fragmentary schematic view on an enlarged scale illustrating more particularly the sleeve material of FIGS. 1 and 2.

As is best seen in FIG. 1 and 3, the bulky multi-filament fill yarn is relatively exposed and unconfined along one edge of the sleeve by reducing the density of the monofilaments in a band of predetermined width extending inwardly from the marginal edge of the material. Most preferably, the individual filaments in the loops of bulky yarn at the extreme marginal edge of the sleeve are not restricted or confined, and have a tendency to readily separate individually and in small bundles or subgroups. In the illustrative embodiment, monofilament density in the band adjacent to the marginal edge is about eight monofilaments per inch in a band about ½ inch wide.

Figure 4:
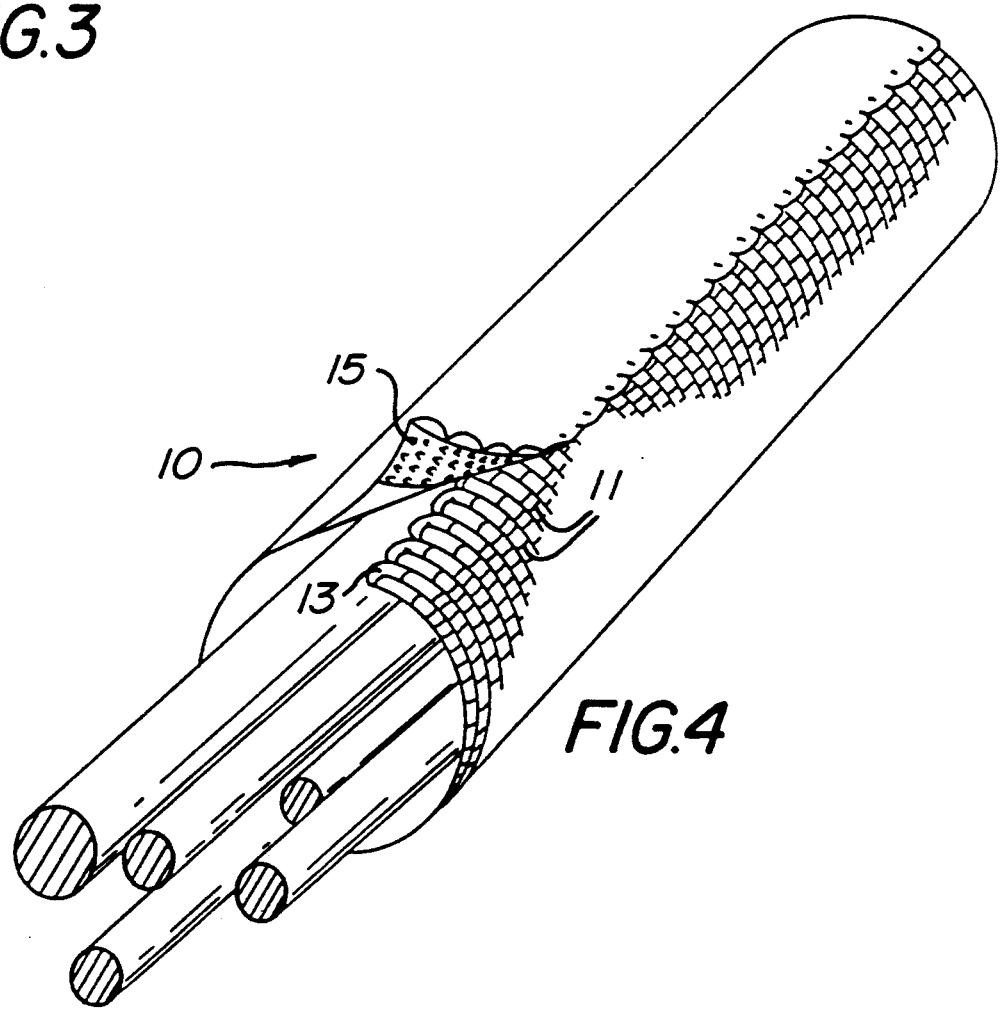
FIG. 4 is a view showing the fastener elements partially interengaged.

Preferably, as best seen in FIGS. 1 and 4, hook means which are in the form of hook type tape of the general type sold under the trademark VELCRO shown at 14 is secured along the opposite marginal edge of the sleeve material. This material comprises a flexible fabric tape material having small hook like elements formed of polyester or the like projecting from the fabric surface as can be seen at 15 in FIG. 4. This tape material is readily available and is generally characterized as having transversely extending rows of hooks, the ends of which are bent over in planes extending generally lengthwise of the tape. The hook type tape may be sewn or otherwise secured directly to the web material. Preferably, and in contrast to the opposite marginal edge, the multi-filament yarn exposed along the marginal edge beyond the limits of the hook type tape is held tightly closed by knitting as shown at 16 in FIG. 1 so as to constrain the loops along this edge. The hook tape and the band of exposed bulky yarn should be of about the same width so as to maximize the interengagement of the hooks with the yarn filaments. Where variations in the diameter of the bundle of elongated elements are to be accommodated by the band of exposed bulky yarn may be somewhat wider than the band of hook tape.

In use, the web of sleeving material is placed around a group of cables to be bundled and the hook elements along one edge of the web pressed into the bulky yarn along the opposite edge. Since the bulky yarn is exposed on both surfaces of the web, closure may be effected with the edges overlapping as in FIG. 4 or in a tadpole configuration if desired.

It has been found that the individual hooks of the hook type tape readily penetrate the exposed bulky yarn in the band along the opposite edge of the web. In as much as the hook type tape is formed with the ends of the hooks extending generally lengthwise of the tape and since the fibers of the bulky yarn are extending generally transversely of the hook ends, the hooks under individual filaments or bundles of filaments allowing for more aggressive hooking action. Although an effective sleeve closure is provided with the arrangements shown in co-pending U.S. application Ser. No. 819,088 filed Jan. 9, 1992, now U.S. Pat. No. 5,178,923, even better results are achieved when the hook type elements are disposed for interengagement with the horizontally disposed filaments of the bulky fill yarn as in the present invention.

In practice, it has been found that the more often the hook type elements are pressed into the bulky yarn, the more effective the bond becomes. This is believed to be due to the opening up of the yarn or pulling apart of the yarn filaments due to the adherence of the hook type elements to the individual filaments and due to the fact that the horizontal disposition of the filaments seems to both facilitate separation of the yarn filaments as the hooks are pressed against them and to promote a hooking action in which the individual hooks interlock with the filaments.

The characteristics of the multi-filament yarn may be varied substantially without departing from the teachings of the present invention. In general, more adherence is achieved between the hooks and the individual filaments of yarn as the yarn becomes more bulky and as more yarn surface area is exposed along the marginal edge.

In accordance with the invention, sleeve formed in accordance with the present inventions are particularly effective for bundling cables where cable break out at locations intermediate the ends of a section of sleeve are desired.

Sleeves so formed are relatively inexpensive to fabricate. The closure means provided resists separation under conditions of stress and vibration, making them suitable for automotive application as well as applications in other forms of moving machinery where it is necessary to bundle cables and other elongated flexible articles.

What is claimed is:

1. A web for the formation of a wraparound sleeve for protecting elongated articles, said web being comprised of interlaced filamentary material and having monofilaments extending in the warp direction;

said web having a first marginal edge having an array of individual hook type fastener means extending lengthwise thereof;

a second marginal edge extending parallel to the first, marginal edge bulky multifilament yarn interlaced with said monofilaments;

said bulky multifilament warp yarns being exposed along said second marginal edge;

said hook type fastener elements being interengageable with the filaments of said bulky multifilaments to secure said marginal edges with the web in surrounding relationship to said elongated articles.

2. A web according to claim 1 wherein said bulky multifilament yarn extends in the fill direction.

3. A web according to claim 2, said bulky multifilament warp yarn being exposed in a band extending lengthwise yarn of said second marginal edge on the inner and the outer surface of said sleeve for joinder by the hook type fastener means alternatively with the inner web surface or the outer web surface.

4. A web according to claim 2 wherein said hook type fastener means comprises fastener hook tape secured along said first marginal edge.

5. A woven sleeve for the protection of elongated substrates, said sleeve comprising:

interlaced filamentary material including bulky multifilament yarn in the fill direction, said bulky multifilament yarn being relatively exposed and unrestrained in a first band extending along one marginal edge of said sleeve;

a band of hook type fastener tape extending along the opposite marginal edge thereof, said hook type fastener tape having an array of individual hook elements projecting away from the surface of the sleeve;

said hook elements being interengagable with the filaments of said bulky yarn for closure of the sleeve around the elongated substrates.

6. A woven sleeve according to claim 5 wherein the sleeve is woven.

7. A woven sleeve according to claim 6 wherein said filamentary material comprises monofilament warps interlaced with said bulky multifilament yarn.

8. A woven sleeve according to claim 7 wherein the density of the monofilament warps adjacent said on marginal edge is substantially less than the density outside of the first band.

9. A woven sleeve according to claim 8 wherein the monofilament warps have a diameter of about 8 to about 15 mils and said bulky yarn has a denier of about 600–2500 and is comprised of about 70 to 450 filaments.

10. A web according to claim 8 wherein said sleeve is a knitted web.

* * * * *

UNITED STATES PATENT AND TRADEMARK OFFICE
CERTIFICATE OF CORRECTION

PATENT NO. : 5,300,337

DATED : April 5, 1994

INVENTOR(S) : Andrieu et al

It is certified that error appears in the above-identified patent and that said Letters Patent is hereby corrected as shown below:

Column 2, line 18, change "separative" to --separation--

Column 2, line 66, change "interengaged;" to --interengaged.--

Column 4, line 10, change "FIG." to --FIGS.--

Column 4, lines 56 and 57, change "In as much" to --Inasmuch--

Column 5, line 21, change "sleeve" to --sleeves--

Column 5, line 22, change "inventions" to --invention--

Column 5, line 23, change "break out" to --breakout--

Column 5, line 41, delete "," after --first--; line 42, after "marginal edge" insert --;-- and begin a new paragraph Column 6, line 9, delete "yarn"

UNITED STATES PATENT AND TRADEMARK OFFICE
CERTIFICATE OF CORRECTION

PATENT NO. : 5,300,337
DATED : April 5, 1994
INVENTOR(S) : Andrieu, et. al.

It is certified that error appears in the above-indentified patent and that said Letters Patent is hereby corrected as shown below:

Column 6, lines 37 and 38, "said on marginal edge" should be --said one marginal edge--.

Signed and Sealed this

Thirtieth Day of August, 1994

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,300,337
DATED      : April 5, 1994
INVENTOR(S): Andrieu et al

It is certified that error appears in the above-indentified patent and that said Letters Patent is hereby corrected as shown below:

```
Column 5, line 44, change "yarns" to --yarn--
Column 6, line 1, change "elements" to --means--
Column 6, line 2, change "multifilaments" to --multifilament yarn--
Column 6, line 37, change "on" to --one--
Column 6, line 42, after "bulky" insert --multifilament--
```

Signed and Sealed this

Fourth Day of November, 1997

Attest:

Attesting Officer

BRUCE LEHMAN
Commissioner of Patents and Trademarks